(12) United States Patent
Lyske

(10) Patent No.: US 10,953,279 B2
(45) Date of Patent: Mar. 23, 2021

(54) TRACKING SYSTEM AND METHOD FOR DETERMINING RELATIVE MOVEMENT OF A PLAYER WITHIN A PLAYING ARENA

(71) Applicant: Time Machine Capital Limited, Stratford-upon-Avon (GB)

(72) Inventor: Joseph Michael William Lyske, Beckenham (GB)

(73) Assignee: TIME MACHINE CAPITAL LIMITED, Stratford-Upon-Avon (GB)

(\*) Notice: Subject to any disclaimer, the term of this patent is extended or adjusted under 35 U.S.C. 154(b) by 330 days.

(21) Appl. No.: 15/778,490

(22) PCT Filed: Nov. 23, 2016

(86) PCT No.: PCT/EP2016/078548
§ 371 (c)(1),
(2) Date: May 23, 2018

(87) PCT Pub. No.: WO2017/089393
PCT Pub. Date: Jun. 1, 2017

(65) Prior Publication Data
US 2018/0280759 A1    Oct. 4, 2018

(30) Foreign Application Priority Data
Nov. 23, 2015    (GB) .................................... 1520663

(51) Int. Cl.
*A63B 24/00* (2006.01)
*G01S 5/30* (2006.01)
(Continued)

(52) U.S. Cl.
CPC ........ *A63B 24/0021* (2013.01); *G01C 21/165* (2013.01); *G01S 5/0018* (2013.01);
(Continued)

(58) Field of Classification Search
CPC ........ A63B 24/0021; A63B 2024/0025; G01C 21/165; G01S 5/18; G01S 5/0018; G01S 5/30
See application file for complete search history.

(56) References Cited

U.S. PATENT DOCUMENTS 4,980,871 A * 12/1990 Sieber ..................... G01S 3/807
318/648
2003/0142210 A1 7/2003 Carlbom et al.
(Continued)

FOREIGN PATENT DOCUMENTS

JP    2002048857 A    2/2002

OTHER PUBLICATIONS

International Search Report arid Written Opinion of the International Searching Authority dated Mar. 30, 2017 in International Application No. PCT/EP2016/078548.
(Continued)

*Primary Examiner* — Ian J Lobo
(74) *Attorney, Agent, or Firm* — Young Law Firm, P.C.

(57) ABSTRACT

The system (10) of FIG. 1 uses fixedly-located master and slave smartphone devices (12, 14) to determine a player position of a player (20) within playing arena, such as a tennis court. The master device (12) makes a local determination of the speed of sound using an audible ping to the slave device displaced from the master device by a known distance. The slave device (14) also responds with a time stamp associated with the receipt of one or more pings. Correlation over successive RF-reported time stamps allows the master device (12) to assess, relative to its own internal reference clock, a time offset and drift for a local clock in the slave device (14). A RF connection to a communications circuit and sensor (18) arrangement located in a racket held by a player permits the master device (12) to assess a time offset and drift for a local clock associated with the sensor.

(Continued)

The sensor (18) further includes a gyroscope, accelerometer and magnetometer that cooperate to record movement or orientation of the racket, and which information is uplink reported over the RF connection to the master device. When an amplitude or modelled sound profile for a "hit" event (24) is detected by both the master and slave devices (12, 14) and the hit event time-stamped by the devices in the system and reported to the master by the communications circuits of the racket and slave units, the master unit is able to triangulate the position of the hit event relative to known dimensions of the playing arena. Continuous reporting of movement of the racket relative to the previous hit event can therefore be displayed to show movement of the player around the court relative to detected sound events.

18 Claims, 1 Drawing Sheet

(51) Int. Cl.
  *G01S 5/18* (2006.01)
  *G01S 5/00* (2006.01)
  *G01C 21/16* (2006.01)

(52) U.S. Cl.
  CPC .......... *G01S 5/0045* (2013.01); *G01S 5/0081* (2013.01); *G01S 5/18* (2013.01); *G01S 5/30* (2013.01); *A63B 2024/0025* (2013.01); *A63B 2220/62* (2013.01)

(56) References Cited

U.S. PATENT DOCUMENTS

| | | | |
|---|---|---|---|
| 2004/0100868 A1* | 5/2004 | Patterson, Jr. | G01R 31/085 367/127 |
| 2008/0219100 A1* | 9/2008 | Fisher | G01S 5/30 367/124 |
| 2010/0198528 A1 | 8/2010 | McCauley | |
| 2011/0135149 A1 | 6/2011 | Gefen | |
| 2013/0053190 A1 | 2/2013 | Mettler | |
| 2014/0206481 A1 | 7/2014 | Zuger | |
| 2017/0061817 A1* | 3/2017 | Mettler May | A61B 5/7405 |

OTHER PUBLICATIONS

Patent Act 1977: Search Report under Section 17(5) dated Jun. 17, 2016 from the UK Intellectual Property Office in GB application GB1520663.4.

* cited by examiner

TRACKING SYSTEM AND METHOD FOR DETERMINING RELATIVE MOVEMENT OF A PLAYER WITHIN A PLAYING ARENA

BACKGROUND TO THE INVENTION

This invention relates, in general, to a tracking system and is particularly, but not exclusively, applicable to a mobile system and related method that monitors and analyses the relative movement of a person in a sporting arena. For example, the mobile system provides analysis of court position and relative movement of a player following the detected hitting of a tennis ball by the player's racket.

SUMMARY OF THE PRIOR ART

Effective movement of a player around a playing arena, such as a tennis court, can mean the difference between winning and losing a competitive point. In the larger scheme of things, an entire match is dependent upon tactically out-thinking, out-manoeuvring and/or adopting a better playing position with respect to the opposing player or team. Player movement—or lack of player movement over time—can also be indicative of both player's level of fitness and/or their ability to anticipate where, in the immediate future, the player needs to be to maximize their effectiveness in countering an opponent's actions, e.g. physical presence or real world response.

Systems are in operation to assist in identifying both the flight path of a ball, such as a cricket ball or football, and also the nature of contact between a racket and a ball.

In the first instance, the Hawk-Eye® tracking system (see http://www.hawkeyeinnovations.co.uk/) uses multiple cameras and heavy computing to record the flight of a ball in 3-D space (relative to a court or pitch), with the technology further permitting predictive modelling of the flight of travel of the ball in the event that the ball's path is inadvertently stopped by a blocking element (such as a cricket pad). Hawk-Eye® tracking system also provides ball trajectory analysis and historically accumulated court contact point analysis showing distribution of ball contact points on the playing surface. The system is, however, relatively expensive and requires a competent professional to set up the cameras in appropriate locations.

In an alternative approach, in which a sensor is placed at the end of a racket handle, the local sensor monitors and reports on detected physical parameters derived or inferred from the racket's movement, position or vibration. For example, in the system manufactured by Babolat® and Zepp Labs of Los Gatos, USA Zepp®, the sensor (see http://www.zepp.com/tennis/?utm_source=google&utm_medium=cpc&utm_campaign=Branded%20-%20GGL%20-%20Exact&gclid=CNWjmr3Iq8gCFQGTaQod7yoAIQ) monitors imparted spin, backswing time, generated power, sweet spot accuracy and racket head speed. Imparted spin has many components, including dwell time on the strings and racket inclination or racket attitude, i.e. relative rotation of the racket with respect to a standard position, e.g. parallel to the ground with the racket tip point at the net. Imparted spin is therefore an important measure since it explains how the ball's spin has changed after the ball has been hit. A Bluetooth® connection uplinks, i.e. relays, information from the sensor to a device, such as a smartphone, to permit the device to capture, process (to the extent needed) and visualize swing data.

Existing systems therefore concentrate on the ball trajectory (i.e. Hawk-Eye) or otherwise the contact point of the racket to the ball as derived from data related to racket movement(s). These system, while analytical in nature, overlook the importance of the player's positioning relative to the court or sports ground, and especially the player's positioning through the context of a point or game.

In another form of system, individual and expert viewers associate live or recorded television content to produce individual player tracking data. For example, in a labour intensive process, the Opta® player tracking system (see http://www.optasports.com/) collects, packages, analyses and distributes live player tracking data. More particularly, in the context of a football match, three expert analysts will cover each match with one collecting all of the home team actions, one all the away team and a third analyst checking the data for consistency and augmenting (if necessary) with additional layers of data. The Opta® player tracking system collects and distributes full, time-stamped, contextual real-time data featuring x-y co-ordinates (as well as z co-ordinates where applicable) of the player to define a physical position of the player in a 2D or 3D-space.

Labour intensive systems that rely on the acquisition of data through on-the-fly tracking of movement (as monitored by the human eye and recorded by controlled cursor movement to record digitally real-life physical activity) are insufficiently robust to deal with fast moving ball sports. Such labour intensive systems therefore generically require a human observer and human interaction through a suitable interface. These system look at building up an overall historical picture so as to allow some subsequent analysis of player activity as it developed in the context of, for example, a selected portion of a training session or game. The reliance on human input means that these tracking systems are ineffectual when trying to follow balls that are small and fast moving over relatively short distances and where, consequently, responding player reaction times are short.

SUMMARY OF THE INVENTION

According to a first aspect of the invention there is provided a player tracking system comprising: at least two transducers placed within or adjacent to a playing area having defined dimensions, each transducer configured to detect sound waves and wherein the at least two transducers are physically separated from each other by a known separation distance; a sensor attached to a piece of sporting equipment, the sensor including: a first clock for generating time-stamp information for a first identified event, a plurality of status-reporting circuits configured to capture parameter data relating to sensed conditions of the piece of sporting equipment around the time of the first identified event, and a transmitter for transmitting time-stamped information and the captured parameter data; a master unit having a reference clock and processing intelligence programmed with both said dimensions of the playing area and the position data identifying the known separation distance and relative placement of the at least two transducers with respect to the playing area, the processing intelligence responsive to the time-stamp information and the parameter data, and wherein the processing intelligence is arranged to: establish a standardized time base between the reference clock and at least the first clock in the sensor, the time base providing an absolute system time for identified events; receive first time-stamp information for the first identified event, the first time-stamp information transmitted from the transmitter of the sensor; receive second and third time-stamp information for an onset of a relevant sound wave acoustically related to the first identified event and detected at each of the transducers within a window of time of the first time-stamp information; make use of the standardized time base, the position data identifying the relative placement of the at least two transducers with respect to the playing area and said received time-stamp information to determine an absolute position for a point of origin of the sound wave associated with the first identified event relative to the defined playing area; make use of the parameter data relating to sensed conditions associated with the first identified event to determine and visually present a track of relative movement of the sensor between successively determined absolute positions associated with the first identified event and a contiguous identified event having a second sound wave generated from a second point of origin resolved by the processing intelligence based on acoustic triangulation of the second point of origin of the second sound wave through use of the standardized time base and time stamp information supplied to the processing intelligence for the contiguous identified event by the at least two transducers and said sensor.

In another aspect of the invention there is provided a method of tracking and plotting relative movement of a sensor within a playing area, the sensor fixed to sporting equipment during a game and wherein the sensor includes a first clock, the method comprising: detecting sound waves incident at a plurality of spaced apart transducers placed within or adjacent to a playing area having defined dimensions; generating time-stamp information for a first identified event sensed at the sensor; capturing parameter data relating to sensed conditions of the sporting equipment around the time of the first identified event; transmitting said time-stamped information and the captured parameter data to a master unit; generating a reference clock at a master unit, the master unit including processing intelligence programmed with both dimensions of the playing area and position data identifying a separation distance between and relative placement of said at least two transducers with respect to the playing area, the processing intelligence responsive to the time-stamp information and the parameter data; establishing a standardized time base between the reference clock and at least the first clock, the time base providing an absolute system time for identified events; receiving first time-stamp information for the first identified event, the first time-stamp information transmitted from the transmitter of the sensor; receiving second and third time-stamp information for an onset of a relevant sound wave acoustically related to the first identified event and detected at each of the transducers within a window of time of the first time-stamp information; using the standardized time base, the position data identifying the relative placement of the at least two transducers with respect to the playing area and said received time-stamp information to determine an absolute position for a point of origin of the sound wave associated with the first identified event relative to the defined playing area; using the parameter data relating to sensed conditions associated with the first identified event to determine and visually present a track of relative movement of the sensor between successively determined absolute positions associated with the first identified event and a contiguous identified event having a second sound wave generated from a second point of origin resolved by the processing intelligence based on acoustic triangulation of the second point of origin of the second sound wave through use of the standardized time base and time stamp information supplied to the processing intelligence for the contiguous identified event by the at least two transducers and said sensor.

In a further aspect of the invention there is provided a computer program product that, when executed by a processor of a computing system, causes the computing system to resolve and track an absolute position of a moveable sensor within a mathematically defined playing area, the computer program product including code arranged to: identify the presence of sound waves incident at a plurality of spaced apart transducers placed within or adjacent to the mathematically defined playing area; receive time-stamp information for a first identified event sensed at the moveable sensor; acquire captured parameter data relating to sensed conditions monitored at the sensor around the time of the first identified event; establish a reference time base for received time-stamp information relative to a system clock, the reference time base providing an absolute system time for identified events; receive second and third time-stamp information for an onset of a relevant sound wave acoustically related to the first identified event as detected at each of a plurality of transducers within a window of time of the first time-stamp information; use the reference time base, position data identifying the relative placement of the at least two transducers with respect to the playing area and said received time-stamp information to determine an absolute position for a point of origin of the sound wave associated with the first identified event relative to the defined playing area; and use captured parameter data relating to sensed conditions associated with the first identified event to determine and visually present a track of relative movement of the sensor between successively determined absolute positions associated with the first identified event and a contiguous identified event having a second sound wave generated from a second point of origin resolved by the processing intelligence based on acoustic triangulation of the second point of origin of the second sound wave through use of the standardized time base and time stamp information supplied for the contiguous identified event by the at least two transducers and said sensor.

In another aspect of the invention there is provided a court-based player tracking system, comprising: a master unit and a slave unit each having a microphone for detecting relevant acoustic events, the master unit and slave unit separated from each other placed at known positions within or adjacent to the court, wherein the master unit and slave unit are each arranged: in response notification of a time of a detected first event at a sensor, to generate a plurality of correlated time stamps for relevant detected acoustic events related to the detected first event, the acoustic event emanating proximate to a sensor located with a racket, and wherein the sensor is arranged to capture and wirelessly uplink parameter data relating to sensed conditions in the sensor around the time of the first event; and wherein the master unit is arranged: to triangulate a point of emanation of the detected acoustic event relative to the court; and determine and visually present a track of relative movement of the sensor between successively determined triangulated points for the sensor as resolved relative to the court.

Advantageously, the present invention provides a new and innovative player tracking system that is inexpensive both to produce and set up, and which system provides accurate analysis of player movement activity between two moments in time within the context of a playing area, such as occurs when a player's racket hits a ball or a ball is kicked. As a particular example, in the context of a multi-point tennis or badminton rally, the system of the present invention monitors and then analyses the activity of one player between successive or multiple contiguous striking of a ball or shuttlecock in play.

The innovative system of the present invention therefore provides a mobile and inexpensive mechanism to determine the absolute position of a player with time and within the playing area. With the system tracking—through time-synchronized detection of sound events—the absolute position of an individual player, the system can further track or otherwise infer relative movement of the player between relevant successive events (such as consecutive ball strikes), thereby providing both a player movement analysis tool for coaches and statistical analysis.

The history of shot information (position, type of shot, etc.) advantageously provides an indication as to how the game/match developed, since it provides insight into player habits, tactics, etc.

BRIEF DESCRIPTION OF THE DRAWINGS

Exemplary embodiments of the present invention will now be described with reference to the accompanying drawings in which.

DETAILED DESCRIPTION OF A PREFERRED EMBODIMENT

Figure 1:
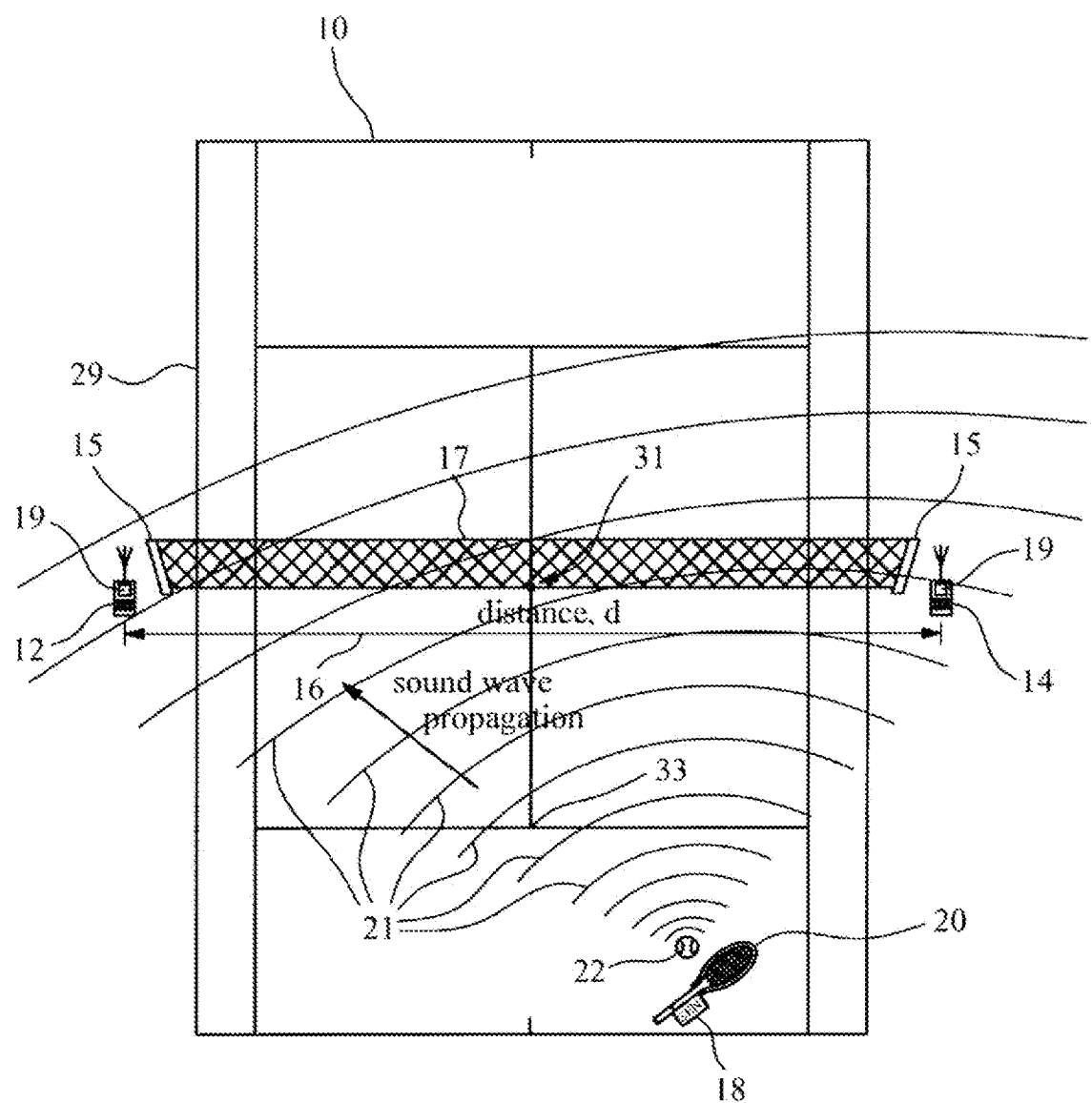
FIG. 1 is a schematic diagram of a sports court or arena in which a player tracking system of a preferred embodiment is deployed and operational.

FIG. 1 is a schematic diagram of, for example, a playing area or sports court 10 (or the like) in which a player tracking system 12, 14 of a preferred embodiment is deployed and operational. For the sake of explanation only, the following description will assume a tennis court environment, although other playing areas are clearly envisioned for the system. It will, of course, be understood that the tracking system can be employed in different environments, such as badminton, squash, table tennis or soccer or other sports in which the system can detect sound-based events. The system makes use of sound analysis to determine the timing of an event, and therefore the position of that event within the context of the court 10.

The tracking system includes at least (and preferably just) two mobile devices 12, 14 separated from each other by a known distance 16 (d). A first device 12 acts as a master device, with the second device 14 acting as its slave device and operation to report acquired data to the master device 12. The devices 12, 14—in the exemplary context of a tennis court—are positioned on or close to net-posts 15 supporting a net 17. It is also envisioned that the master and slave roles can be reversed, with this role-reversal reflecting the monitoring multiple players. For example, in the context of a singles tennis game where two opposing players are on opposite sides of the net, the first player may be tracked with the first device 12 being the master and the second device 14 being the slave, whereas the opposing player is tracked with the second device 14 being the master and the first device its slave. The master-slave operation may, optionally, be performed contemporaneously by both devices since the racket-based sensor provides information to the mobile units to indicate which player is responsible for the source of the sound.

Typically, the two mobile devices 12, 14 may be implemented as appropriately programmed smartphones, with each device 12, 14 including an audio transducer 19, e.g. a microphone, and communications circuits allowing transmission, reception and decoding of wireless data signals, such as in the RF domain. The transducer effectively operates to convert incident detected sound, i.e. sound waves, into a digital representation of the sound that can be analysed relative to a sound characteristics (shown in FIG. 2) reflective of a particular sound event of interest that can be associated with a player movement. More detail of the preferred mechanism for identifying the position of the sound detected sound event will be described below.

In a permanently deployed system that incorporates a sound detection system integrated into (for example) the net posts, communication between the two sound-sensing devices—that replace the exemplary smartphones of FIG. 1—could be a wired connection. The sound detection system can therefore be simplified to multiple resolvably identifiable microphones that feed information into a centralised processing unit, such as a computer acting as the processing unit and the transducers operating as passive reporting devices of sound events.

The term "master" should be understood to include devices that include independent processing capabilities, whereas a "slave" may include limited processing and/or just a device capable of detecting a sound event.

In the exemplary and contextual explanation of a tennis tracking system of FIG. 1, the master and slave devices are independent smartphones.

The transducers 19 are preferably pointed in the direction of the player whose movement is to be analysed by the tracking system of the preferred embodiment. The transducers may be integrated into the smartphones, but may alternatively be discrete direction microphones operationally coupled to the master and slave devices 12, 14 through an interface. Positioning of the transducers is preferably above ground level, e.g. between the middle and towards the top of the net-posts. Other positions are possible, although positioning/orientation of the transducer is preferably optimized to capture propagation of sound wave 21 radiating from a hit event. Positioning of the master and slave devices may be on a stand, e.g. on the outside doubles line 29.

The distance (d) 16 between the master and slave devices 12, 14 is measured and recorded, and the relative positions of the master and slave device 12, 14 established with respect to a datum 31 on the tennis court. For example, the datum 31 may be at the bottom centre position of the net 17, but other positions are possible, e.g. at the service "T" mid-point 33. The physical dimensions of the playing area, e.g. the tennis court markings, are programmed into the master unit so that it can eventually plot (e.g. display through a graphic user interface or otherwise output) identified and resolved sound events of tennis ball "hits" relative to the court; these dimensions may be taken directly from established rules for a game (such as by a stipulated tennis court size) or by measurement where there is some variation permitted by the rules with respect to minimum and maximum playing area sizes (e.g. for football pitch widths). The separation distance between the master and slave devices 12, 14 may also be pre-set based on pre-set court sizing and location of the master and slave devices. For example, positioning of the master and slave devices on the top of the net posts 15 may always yield a fixed separation defined by the rules of the game under analysis. Of course, electronic or taped measurements are also possible. Separation of the transducers will generally be in the range of several metres and up to many tens of metres. Separation may typically be greater than a width of the playing area and therefore transducer placement may be adjacent to or outside of the playing area.

Preferably, measured court dimensions and master-slave separation (or the separation of two or more transducers) is within a tolerance relative to the size of the playing area. For a tennis courts, measurement positioning determination and separation is better than about ten centimetres (+/−10 cm). Direct line of sight placement is preferred since subsequent timing and position calculation can be based on shorted propagation times that ignore or at least mitigate multi-path processes. In other words, placement of the transducers in line of sight ensures that the first sound that reaches the transducer has travelled the shortest path (and is not a complex assembly of multiple reflections). This means that the first detected sound is always relevant and always associated with the sound event under investigation/analysis.

Both the master device 12 and slave device 14 perform equal amounts of processing for detection of a sound event, but the master device 12 completes further processing to resolve the origin of the sound event relative to the court 10. Timing data, i.e. a local time stamp, associated with sound captured by the slave device 14 is linked over a suitable connection (such as a radio frequency link, e.g. an established Bluetooth® connection) to the master device 12. Data can be streamed in near-real time or otherwise accumulated and then downloaded to the master unit periodically or upon instruction.

The tracking system further includes a sensor 18 mounted to a racket 20 used to hit a ball 22. The sensor 18, which may be integrated into the racket 20, but may alternatively be realized by a strap-on or mountable device attached to the handle or head of the racket, includes circuits (that may be individual and discrete or otherwise share circuit components) that realize: i) an accelerometer—preferably a 3-D accelerometer—for providing relative directional indications in at least the x and y planes and preferably also the z-plane, and also to support calculation of speed of movement; ii) a gyroscope to provide an indication of speed of rotation about its own axes to permit processed resolution of racket orientation or inclination relative to, for example, a vertical plane; and iii) a magnetometer to provide an indication of racket direction relative to a directional datum, i.e. the Earth's magnetic field.

It is noted that a 2D-accelerometer provides insufficient information for movements in 3D space, so any tilting of a 2D accelerometer in a 3D environment would not be able to resolve precise movement. 2D accelerometers may be used where movement is planar.

The sensor 18 may be realized by one or more discrete devices. Other complimentary or functionally alternative sensors, as will be understood, may be provided to supplement data and reinforce accuracy in the calculation of the racket's attitude/inclination, the racket's movement and the origin of the sound event (e.g. the ball hit-contact point) in three-dimensional space.

The sensor 18 further includes a reference timing circuit ("clock") that can generate a time stamp (based typically on a crystal oscillator), and a relatively low power transmitter circuit (such as a Bluetooth communications circuit) that can code and then transmit time stamped data.

In the context of a "hit event" or "hit", the contact of, for example, a ball on the strings of the racket 20 produces a sound 22 having a particular envelope profile 24 defined by rising 26 and falling 28 amplitudes over short periods (as viewed in the time domain). The tracking system makes use of a sounds database of pre-identified sound envelope profiles that are stored within and accessible to at least the master device. These stored pre-identified sound envelope profiles can be matched with a detected sound recorded by both the master and slave devices 12, 14. Matching does not require an identical mapping of profiles, since minor envelope components may change without affecting defining characteristics in any sound event. Correlation may therefore adopt a holistic approach where a high degree of correlation in significant characteristics indicates a detected hit event of relevance. Correlation may make use of quantized levels relative to pre-set threshold values, or other graphical analysis techniques as are well known in the art.

Use of a database of hit profiles provides a greater correlation with an identified sound event by allowing selective filtering of deemed irrelevant sounds.

The term "sound envelope profile(s)" should be understood to be any appropriate representation of the sound.

An alternative embodiment does not apply this filtering mechanism and the comparison of sound envelopes, but instead looks for any detected sound event within a window of a reported time stamp for a hit monitored by the local sensor (in or on the racket). In this arrangement, the processing intelligence looks for an increase in the amplitude of the detected/recorded audio within a window, typically about +/−250 ms or less, of the reported hit event (as detected by the local sensor).

In overview, when respective transducers of the master and slave devices 12, 14 detect sound events within a window that, when processed by a signal processor (such as a microcontroller in the smartphone), either (i) reflect an amplitude increase in audio above a threshold level, or otherwise (ii) correlate to an envelope profile sufficiently similar to one of the pre-identified sound envelope profiles, a hit event is registered by both the master and slave devices 12, 14 and both events (at the respective devices) are time stamped and recorded. Detected sounds that are assessed to have an amplitude too low or otherwise insufficiently close to one of the stored sound envelope profiles are rejected and thus ignored in subsequent tracking analysis.

The master and slave devices 12, 14 listen for hit events within a window of time from the reported event detected by the racket sensor 18, with the system (e.g. the master device 12) tasked to resolve hit event positioning within the court.

Correlation of the reported time for hit events at the racket 20 with the subsequent detected sounds events at both the master and slave devices 12, 14 supports triangulation and location of the hit event within in the context of the playing arena, i.e. in the context of the court in a tennis environment. Direct sound propagation times from the hit point will invariably be different (unless the origin of the sound is exactly equidistant) to each transducer in the respective master and slave devices. Propagation times are therefore used to resolve position for the origin of the sound event provided that an accurate understanding of time synchronization is known). The system intelligence therefore establishes a reference time base that compensates for operational discrepancies between clocks or timing circuits operating at different sensing units within the system.

In the context of stored sound characteristics and the filtering approach (rather than the simplified audio level approach where amplitude acts as a trigger above a pre-set threshold), sampling of sounds to produce sound envelope profiles (with discernible characteristics)—used as reference data in the sounds database—can be modelled or empirically assembled from physical testing.

Operationally, the system is preferably always pre-calibrated to estimate the speed of sound in the playing environment. More specifically, it will be understood that the speed of sound varies as a function of air pressure, temperature and humidity, so an accurate understanding of these variables and their impact on the speed of sound improves resolution of "hit" events. The system preferably therefore empirically determines a speed of sound for prevailing atmospheric conditions.

Typically, with today's off-the-shelf smartphone technology, on-board processing can produce an audio sampling rate of around forty-four thousands samples per second or better. Given that the speed of sound is nominally in the region of 30 cm per millisecond, sound-based triangulation according to a preferred embodiment can provide a ball hit position resolution to within about +/−1 cm (or better)

To establish a common time base that produces a standardized time for the tracking system that compensates for production variations in crystal oscillators, clock offsets and clock drift, the present invention uses a relative short correlation period to establish clock drift and offset timing between the various clocks in the sensor 18 and master and slave units. This typically occurs over a few minutes prior to first use.

If there is a centralized unit for a fixed system, then the master reference clock is at the centralized unit and this master reference clock is arranged to provide time-stamping of audio events as remotely monitored and captured and then reported to the centralized unit by signal-coupled microphone transducers.

Time base correlation can, of course, be periodically checked and re-checked every few minutes (e.g. a game or rest intervals). It will be understood that the term correlation, in essence, is a process for synchronization of disparate time-stamp sources at the racket 20 and at least the master device 12 and possibly also the slave device 14 should a smartphone realization be implemented.

"Clock drift" is a measure of how much faster or slower one clock gains or loses time relative to another clock. For example, relative to a datum time source (such as within a master slave device), crystal drift of a secondary device (such as in the slave device) may indicate that a synchronization is lost at a rate of, say, five second per hour. This loss of synchronization needs to be compensated when measurements occur over fractions of a second. The term "timing offset" relates to the nominal clock times at each of the racket and master and slave devices. For example, a reference time at the master device 12 may indicate 00:00:00, whereas the clock time at the at the slave device 14 may be 00:00:03. Of course, there may be higher accuracies applied to reflect, for example, millisecond (or better) accuracy in each clock. Indeed, time-stamping is preferably at the millisecond or sub-millisecond levels.

Timing calibration/synchronization may be based on a round-trip RF transmission and response. Evaluation of system synchronization may be run over tens of seconds to potentially several minutes.

Bluetooth® connectivity for reported timing events is preferred since this inherently provides for device pairing and a level of specificity. Other RF transmission schemes may be adopted by the system of the present invention, especially since Bluetooth® connectivity has a generally limited range of a few tens of metres.

Once a time relationship between the clocks of the master device 12 and the slave device 14 and also the master device and the sensor 18 in the racket 20 has been established, an assessment of the speed of sound is made. Note: the master device and sensor device may be processing functions performed in a standalone computer and the racket sensor, respectively, whilst the sound detecting transducers being passive elements rather than processor-based smartphones. If the transducers are within a smartphone enclosure, then relative clock timing between all active processing systems components must be known.

For speed of sound assessment, the master device 12 sends out an audible "ping" with a request for response. The master unit 12 is aware of the relative timing of the audible ping. The slave device detects the "ping" and immediately responds by broadcasting either a return ping and/or its local capture time for the ping. Given that the known separation distance 16 between the master device 12 and slave device 14 and the understanding of time clock synchronization, the time of the return ping can be used to evaluate the speed of sound using equations well known to the skilled addressee. The ping can be sent multiple times to establish an averaged result. Minimal initial processing at the slave unit minimizes the potential error in the calculation of the "local" speed of sound by the master device 12.

An alternative approach to establishing the speed of sound that makes use of a trigger instruction sent from the master unit 12 causes the slave unit to commence a series of audio burst transmissions that are separated in time by a fixed time displacement. Detection of the rising edge of the audio signal in the time domain and a known separation between audio pulses allows the master unit 12 to evaluate the speed of sound (given that it is aware of the separation 16 to the slave device 14).

The slave device 14, at some point after or contemporaneously with responding to the master-initiated downlink ping, also broadcasts its local time back to the master device 12. If the master device 12 can establish the local time at the slave device 14, then a timing offset can be established. More specifically, making use of its reference clock time, the master unit 12 knows precisely when it generated and sent the downlink ping, so a return time stamp from the slave device 14 that identifies the local time when ping was received at the slave device establishes the relative offset between the respective local clocks in the master and slave devices 12, 14. Repeating the ping processes can further be used to establish relative frequency drift, since time stamping at the slave device 14 will, with time, show a small variation in local time in the slave device relative to the reference of the clock in the master device 12.

The system now has resolved a local speed of sound and, furthermore, the timing offset and the timing drift of the slave device 14 (relative to the master device 12).

With respect to the racket, the master device 12 needs to establish a timing offset in the racket's local clock, as well as any clock drift that can affect understood synchronization between the reference time of the master unit's clock and any applied time stamp at the racket 20. Again, in a similar process to that described above, the master unit can address the racket using an RF ping sent at a known time. With a ping-response from the racket that expressly identifies the captured time of the ping by the clock in the racket, the master unit can evaluate the relative clock timing offset and clock drift. Again, the process is typically repeated many times over several minutes. Operating in a RF domain provides near instantaneous reception, especially over short line-of-sight distance of tens of metres. The relative propagation times for radio frequencies mean that a report of the local time relative to the reference time (at the master device 12) evaluates synchronization and drift.

The speed to sound is assessed relative to a fixed position of the slave device 14, so the position of the racket is not germane to the assessment of timing offset and drift.

In the case of a centralized unit where there's a common time base to passive transducers, one of the transducer includes a speaker function. Measurement of the distance between the centralized unit to the speaker is therefore germane to the calculation of the speed of sound as determined by monitoring of the instructed, audibly broadcast "ping" from the speaker.

Of course, rather than to use to the slave device 14, the racket's sensors could equally well be used independently—or in combination with the slave device—provided that the racket sensor's relative distance displacement was known with respect to the fixed location of the master device 12.

The master unit is now armed with an understanding of the local speed of sound, as well as time offsets to, and drifts in, the clocks in both the racket and slave device.

Figure 2:
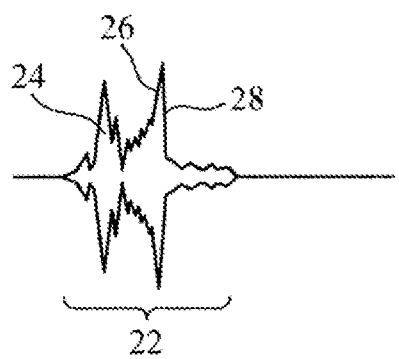
FIG. 2 is a time-domain waveform diagram of a noise event having discernible characteristics representative of a trackable event.

In an analysis mode, master and slave units now simply look for audio "hit" event profiles (see, for example, FIG. 2).

More specifically, the sensor 18 in the racket detects a "hit" and time stamps the hit. This time stamp information is broadcast. Both the master and slave units detect the "hit" based on a characteristic profile. Both the master and slave units record the time that the sound of the hit reaches their respective transducers. Propagation times from the racket to the master and slave devices will, of course, depend upon the relative closeness of the hit event to one or other of the master and slave device 12, 14. The slave device 14, therefore, may include a memory that stores recorded capture times for events that have sufficient correlation to characteristics of stored sound envelope profiles.

In general, once the master unit 12 captures a discernible sound that substantially matches a pre-stored sound envelope profile, the processor of the master device 12 records an arrival time relative to its master time reference. Spatial distance to the noise event can be calculated from the propagation time, knowing the clock offset between clocks and relative clock drift.

Secondarily, the master unit now generates a warning or enquiry to the slave unit 14. The warning or enquiry is either: "expect a relevant sound event and report your local capture time", or "have you received a relevant sound event in the past x milliseconds and, if so, report your local capture time for that relevant sound event".

Typically, the investigation into the presence and relevance of slave's capture of a sound event will be set within a maximum window for audio investigation of a few seconds (depending on the nature of the sport being investigated) For a game of tennis, the window typically less than about 250 milliseconds (ms), as indicated above.

Since the master device 12 is aware of the clock offset and the clock drift (error) in the clock of the slave unit, the master device is able (in combination with the received time stamp from the racket 20) to triangulate the relative court position of the hit event.

A final piece of the puzzle relates to orientation, speed and movement of the racket 20 as determined by the sensor's gyroscope, accelerometer and magnetometer. Following reporting of the time-stamping of the hit (or contemporaneously with the time-stamp report), the data accumulated by the gyroscope, accelerometer and magnetometer is uplink reported over the RF connection to the master unit; this can be communicated on an ongoing streamed basis in near-real time (or otherwise sent later as a time-stamped data file). Reporting from the sensor 18 in the racket preferably occurs multiple times per second, e.g. a sampling rate of about forty hertz. Continuous reporting of movement of the racket relative to the previous hit event can therefore show movement of the player around the court.

The sum of the reported information (from the racket sensor 18) then allows the master unit to assemble a timed succession of hit events and racket position (and inferred player position given the player is proximate to the sensor), with this information allowing statistical analysis of racket (and therefore player) movement and particularly racket position relative to the playing area or arena 10. The information is preferably output on a GUI in the form of a pictorial representation of successive hit events. This history therefore shows ball strike information and infers tactical awareness through movement and fitness levels based on successive ball return positions for the player under assessment.

With respect to the time-stamped information received and resolved by the master unit from the racket's sensor 18 and the transducers (as, for example, supported by two or more smartphones), the system intelligence is able to determine the origin from where the ball (in the exemplary context of a game of tennis) has been hit, i.e. the source of the sound. Given the time stamps only, the system intelligence can resolve the location of the hit to two possible court positions only; one either side of the net and one being the mirror image of the other. In order to precisely locate the location of the hit, the system intelligence determines whether the master unit is either on the left or right side of the playing area 10. Since the master device (or the centralized unit in the case of a fixed system) and the racket sensor 18 include a magnetometer, each of these units is able to provide an indication of directional north. With the data from the racket's sensor reporting direction of the racket at the point of ball strike, the system intelligence is therefore able to resolve the direction of travel of the ball relative to directional north and thus is able to resolve the player position with respect to both the net and the court area 10.

Unless specific arrangements are mutually exclusive with one another, the various embodiments described herein can be combined to enhance system functionality and/or to produce complementary functions in the effective delivery of a player tracking system. Such combinations will be readily appreciated by the skilled addressee given the totality of the foregoing description. Likewise, aspects of the preferred embodiments may be implemented in standalone arrangements where more selected functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

Control software for tracking according to the present invention may be provided in a downloadable form or otherwise on a computer readable medium, such as a USB stick, that contains program code that, when instantiated, executes tracking and/or analysis functionality. The control software (or "system intelligence") may be distributed or centralized, and may be acquired in the form of an "app".

With respect to the sensor location, it is preferred that small lightweight integrated circuit packages can be manufactured for deployment in or on sporting equipment, including rackets, balls or posts supporting a net or defining a pitch dimension, or otherwise deployed in or on items of attire, e.g. shoes, lanyards, jerseys or wristbands, worn by participating players whose movement is to be automatically monitored.

It will, of course, be appreciated that the above description has been given by way of example only and that modifications in detail may be made within the scope of the present invention. For example, whilst the preferred embodiment has been described in the context of monitoring a tennis player's court movement, the present invention finds applications across a multiplicity of sports, including but not limited to badminton, squash, hockey and football/soccer. Consequently, unless the term "racket" requires its natural usage in the context of the specific explanations provided above, the term should be understood to be analogous to a "club", "bat" or "stick".

The invention claimed is:

1. A player tracking system comprising:
   at least two transducers placed within or adjacent to a playing area having defined dimensions, each transducer configured to detect sound waves and wherein the at least two transducers are physically separated from each other by a known separation distance;
   a sensor attached to a piece of sporting equipment, the sensor including:
   a first clock for generating time-stamp information for a first identified event,
   a plurality of status-reporting circuits configured to capture parameter data relating to sensed conditions of the piece of sporting equipment around the time of the first identified event, and
   a transmitter for transmitting time-stamped information and the captured parameter data;
   a master unit having a reference clock and processing intelligence programmed with both said dimensions of the playing area and the position data identifying the known separation distance and relative placement of the at least two transducers with respect to the playing area, the processing intelligence responsive to the time-stamp information and the parameter data, and wherein the processing intelligence is arranged to:
   establish a standardized time base between the reference clock and at least the first clock in the sensor, the time base providing an absolute system time for identified events;
   receive first time-stamp information for the first identified event, the first time-stamp information transmitted from the transmitter of the sensor;
   receive second and third time-stamp information for an onset of a relevant sound wave acoustically related to the first identified event and detected at each of the transducers within a window of time of the first time-stamp information;
   make use of the standardized time base, the position data identifying the relative placement of the at least two transducers with respect to the playing area and said received time-stamp information to determine an absolute position for a point of origin of the sound wave associated with the first identified event relative to the defined playing area;
   make use of the parameter data relating to sensed conditions associated with the first identified event to determine and visually present a track of relative movement of the sensor between successively determined absolute positions associated with the first identified event and a contiguous identified event having a second sound wave generated from a second point of origin resolved by the processing intelligence based on acoustic triangulation of the second point of origin of the second sound wave through use of the standardized time base and time stamp information supplied to the processing intelligence for the contiguous identified event by the at least two transducers and said sensor.

2. The player tracking system according to claim 1, wherein the plurality of status-reporting circuits include:
   i) an accelerometer for providing relative directional indications and speed of movement;
   ii) a gyroscope to provide an indication of speed of rotation about its own axes to permit processed resolution of orientation or inclination of the sporting equipment relative to a datum plane; and
   iii) a magnetometer to provide an indication of the sporting equipment's direction relative to a directional datum.

3. The player tracking system according to claim 1, wherein the standardized time compensates for clock drift and relative clock offsets.

4. The player tracking system according to claim 1, wherein the at least two transducers are smartphones.

5. The player tracking system according to claim 1, wherein the processing intelligence generates and presents a statistical analysis of movement or positioning of the sensor.

6. The player tracking system according to claim 1, wherein each identified event is determined by comparison of a predetermined threshold amplitude and a measured amplitude of an acoustic signal received at the at least two transducers.

7. The player tracking system according to claim 1, wherein each identified event is determined by correlation of a reference envelope profile with a measured envelope profile for an acoustic signal received at the at least two transducers.

8. The player tracking system according to claim 1, wherein the system is further configured to determine a speed of sound in the playing area, the system including a sound generator for generating audible pings from a first device physically separated from one of said at least two transducers by the known distance or a second measured distance, the system intelligence further arranged to determine a transit time for the audible pings between the sound generator and the said one of said at least two transducers.

9. The player tracking system according to claim 8, wherein the speed of sound assessment is conducted periodically.

10. The player tracking system according to claim 1, wherein the first transducer is within a master device and the second transducer with a slave device, the master device arranged to resolve the absolute position for points of origin of said sound waves.

11. The player tracking system of claim 1, wherein the playing area is a court and the sensor is located with a racket, and
   wherein the master unit is arranged:
   to triangulate a point of emanation of the detected acoustic event relative to the court; and
   determine and visually present a track of relative movement of the sensor between successively determined triangulated points for the sensor as resolved relative to a court.

12. A method of tracking and plotting relative movement of a sensor within a playing area, the sensor fixed to sporting equipment during a game and wherein the sensor includes a first clock and a transmitter, the method comprising:

detecting sound waves incident at a plurality of spaced apart transducers placed within or adjacent to a playing area having defined dimensions;

generating time-stamp information for a first identified event sensed at the sensor;

capturing parameter data relating to sensed conditions of the sporting equipment around the time of the first identified event;

transmitting said time-stamped information and the captured parameter data to a master unit;

generating a reference clock at a master unit, the master unit including processing intelligence programmed with both dimensions of the playing area and position data identifying a separation distance between and relative placement of said at least two transducers with respect to the playing area, the processing intelligence responsive to the time-stamp information and the parameter data;

establishing a standardized time base between the reference clock and at least the first clock, the time base providing an absolute system time for identified events;

receiving first time-stamp information for the first identified event, the first time-stamp information transmitted from the transmitter of the sensor;

receiving second and third time-stamp information for an onset of a relevant sound wave acoustically related to the first identified event and detected at each of the transducers within a window of time of the first time-stamp information;

using the standardized time base, the position data identifying the relative placement of the at least two transducers with respect to the playing area and said received time-stamp information to determine an absolute position for a point of origin of the sound wave associated with the first identified event relative to the defined playing area;

using the parameter data relating to sensed conditions associated with the first identified event to determine and visually present a track of relative movement of the sensor between successively determined absolute positions associated with the first identified event and a contiguous identified event having a second sound wave generated from a second point of origin resolved by the processing intelligence based on acoustic triangulation of the second point of origin of the second sound wave through use of the standardized time base and time stamp information supplied to the processing intelligence for the contiguous identified event by the at least two transducers and said sensor.

13. The method of tracking and plotting according to claim 12, further comprising:
    determining each identified event by comparison of a predetermined threshold amplitude and a measured amplitude of an acoustic signal received at the at least two transducers.

14. The method of tracking and plotting according to claim 12, further comprising:
    determining each identified event by correlation of a reference envelope profile with a measured envelope profile for an acoustic signal received at the at least two transducers.

15. The method of tracking and plotting according to claim 12, further comprising:
    determining a speed of sound in the playing area by generating audible pings from a first device physically separated from one of said at least two transducers by the known distance or a second measured distance; and
    resolving the absolute position based on the determined speed of sound.

16. A computer program product that, when executed by a processor of a computing system, causes the computing system to resolve and track an absolute position of a moveable sensor within a mathematically defined playing area, the computer program product including code arranged to:
    identify the presence of sound waves incident at a plurality of spaced apart transducers placed within or adjacent to the mathematically defined playing area;
    receive time-stamp information for a first identified event sensed at the moveable sensor;
    acquire captured parameter data relating to sensed conditions monitored at the sensor around the time of the first identified event;
    establish a reference time base for received time-stamp information relative to a system clock, the reference time base providing an absolute system time for identified events;
    receive second and third time-stamp information for an onset of a relevant sound wave acoustically related to the first identified event as detected at each of a plurality of transducers within a window of time of the first time-stamp information;
    use the reference time base, position data identifying the relative placement of the at least two transducers with respect to the playing area and said received time-stamp information to determine an absolute position for a point of origin of the sound wave associated with the first identified event relative to the defined playing area;
    use captured parameter data relating to sensed conditions associated with the first identified event to determine and visually present a track of relative movement of the sensor between successively determined absolute positions associated with the first identified event and a contiguous identified event having a second sound wave generated from a second point of origin resolved by the processing intelligence based on acoustic triangulation of the second point of origin of the second sound wave through use of the standardized time base and time stamp information supplied for the contiguous identified event by the at least two transducers and said sensor.

17. The computer program product according to claim 16, wherein the first transducer is within a master device and the second transducer with a slave device, the master device arranged to resolve the absolute position for points of origin of said sound waves.

18. The computer program product according to claim 16, wherein the computer program product is downloaded as an app.

* * * * *